Jan. 17, 1956 H. EDLSTEIN 2,731,564

BARIUM TITANATE TEMPERATURE CONTROL

Filed Nov. 5, 1951

INVENTOR.
HAROLD EDELSTEIN
BY
Harry M. Saragovitz
Attorney 2,731,564
Patented Jan. 17, 1956

1

2,731,564

BARIUM TITANATE TEMPERATURE CONTROL

Harold Edelstein, Long Branch, N. J., assignor to the United States of America as represented by the Secretary of the Army Application November 5, 1951, Serial No. 254,967

2 Claims. (Cl. 250—36)

(Granted under Title 35, U. S. Code (1952), sec. 266)

The invention described herein may be manufactured and used by or for the Government for governmental purposes, without the payment of any royalty thereon.

The present invention relates to an electronic system for producing a constant temperature over a prolonged period of time, and more particularly to said system wherein the power source is a crystal controlled oscillator. The present invention also relates to an oven construction particularly adaptable to the said system.

An object of this invention is to provide an electronic system for producing a constant temperature over a prolonged period of time regardless of ambient temperature changes.

Another object of this invention is to provide an electronic system for producing a constant temperature over a prolonged period of time wherein the power source is a crystal controlled oscillator.

Still another object of this invention is to provide an oven particularly adaptable for use in the herein disclosed electronic system.

These and other objects of the present invention will become apparent from the description and claims that follow.

Figure 1:
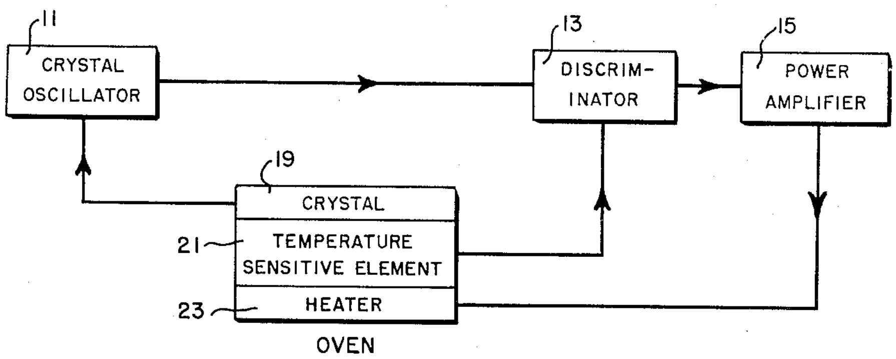
Figure 2:
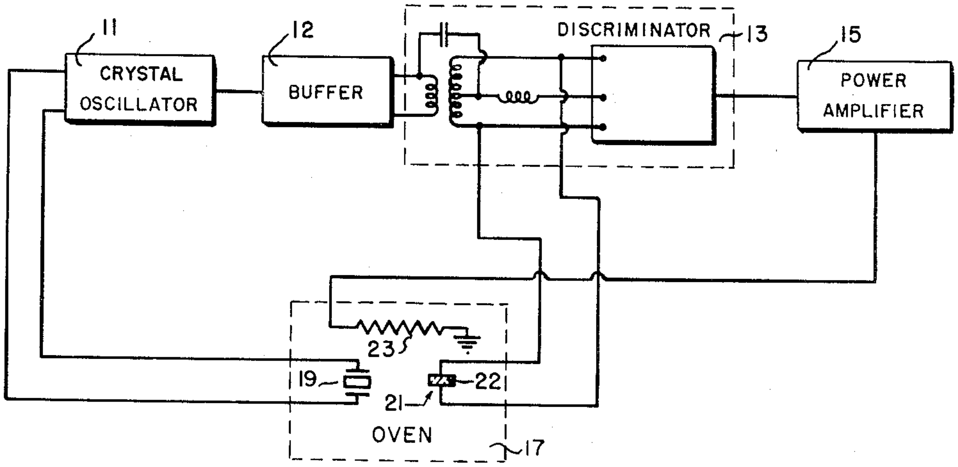

Referring to Figs. 1 and 2, wherein like numerals refer to like parts, the electronic system of the present invention is shown to comprise in combination a crystal oscillator 11, discriminator 13, power amplifier 15 and oven 17. The use of buffer amplifier 12, as shown in Fig. 2, is optional. Oven 17 is shown to contain crystal 19, temperature sensitive element 21, and heater 23. Temperature element 21 is preferably in the form of a temperature sensitive variable capacitor having a barium titanate dielectric 22. The crystal 19 is the crystal of oscillator 11, temperature sensitive element 21 is connected across the secondary 14 of discriminator 13 (which may be of the "series" or center-tuned type as shown in Fig. 12–38A "The Radio Amateur's Handbook," 25th Edition, p. 416 (1948)), and heater 23 is connected to the output terminals of power amplifier 15 (generally a 6L6 tube connected across the output of discriminator 13). Heater 23, as shown in Fig. 2 is generally in the form of a grounded resistance wire element connected to the cathode of the 6L6 power amplifier. Because of its nature the present system, in addition to providing a constant temperature produces a constant frequency, which may be used as a frequency standard.

In the system disclosed in Figs. 1 and 2 temperature sensitive element 21 is connected across the secondary of discriminator 13 and controls the resonant frequency thereof in such a manner that the discriminator output varies inversely with any temperature change. The output of discriminator 13 is then fed into power amplifier 15 and a temperature compensating current fed from amplifier 15 to heater 23. Since crystal 19 is maintained at a constant temperature within oven 17, it may be expected that crystal oscillator 11 will produce a constant frequency output which may be uesd as a frequency standard.

2

The temperature sensitive element of the present invention, as stated above, preferably consists of a stacked plate type of capacitor having a barium titanate dielectric. The actual composition of the titanate is dependent upon the desired oven temperature. Since the dielectric constant of the titanate changes with temperature, the capacity of the temperature sensitive element will change also. Because the temperature sensitive element is used as the control capacitor of the discriminator and thus determines the resonant frequency of the discriminator, it will also determine the current flow into the heater element. The desired titanate composition may thus be readily determined from an analysis of the discriminator characteristics, the crystal oscillator frequency, and the desired oven temperature.

As many apparently widely different embodiments of the invention may be made without departing from the spirit and scope hereof, it is to be understood that the invention is not limited to its specific embodiments except as defined in the appended claims.

What is claimed is:

1. A constant temperature control apparatus for an oven comprising, an oven having a heating element mounted therein, a power amplifier having an output circuit connected to said heating element to provide the heat therefor, a stable oscillator, a tuned frequency discriminator coupled to said oscillator and tuned normally to the output frequency thereof, a temperature sensitive reactance element within said oven forming part of the tuning of said discriminator, and a bias connection from the output of said discriminator to the control grid of said amplifier, whereby a deviation of oven temperature from normal in one sense alters the reactance of said temperature sensitive reactance and therewith the tuning of the discriminator and the output of said amplifier to vary the heat applied to the oven in such sense as to counteract said temperature deviation.

2. An oven temperature control apparatus comprising, an oven including therein a heating element, a piezo-electric crystal and a temperature sensitive condenser having a negative temperature coefficient of capacity, a power amplifier having an output circuit connected to said heater to supply the heating energy therefor, an oscillator and a connection from said piezo-electric crystal thereto to determine the stable frequency thereof, a tuned frequency discriminator coupled to the output of said oscillator, a connection from said temperature senstive condenser to the tuning of said discriminator to determine the tuned frequency thereof, and a bias connection from the output of the discriminator to the control grid of said power amplifier, whereby a deviation of oven temperature from normal alters the reactance of said temperature sensitive condenser in such sense as to counteract said temperature deviation.

References Cited in the file of this patent

UNITED STATES PATENTS

| | | |
|---|---|---|
| 1,882,989 | Schumacher | Oct. 18, 1932 |
| 1,907,132 | Thurston | May 2, 1933 |
| 2,017,859 | Halstead | Oct. 22, 1935 |
| 2,069,633 | Tripp | Feb. 2, 1937 |
| 2,423,229 | Crosby | July 1, 1947 |
| 2,505,565 | Michel | Apr. 25, 1950 |
| 2,600,288 | Zylstra | June 10, 1952 |
| 2,639,376 | Donley et al. | May 19, 1953 |
| 2,640,918 | Wentworth et al. | June 2, 1953 |